United States Patent [19]

Löbach et al.

[11] 4,254,255

[45] Mar. 3, 1981

[54] AQUEOUS REACTION OF POLYAMINE WITH ALKYLENE DIHALIDE IN PRESENCE OF EMULSIFIER

[75] Inventors: Wilfried Löbach, Bonn; Wolfgang Lehmann, Leverkusen; Friedhelm Müller, Odenthal, all of Fed. Rep. of Germany

[73] Assignee: Bayer Aktiengesellschaft, Leverkusen, Fed. Rep. of Germany

[21] Appl. No.: 4,803

[22] Filed: Jan. 19, 1979

[30] Foreign Application Priority Data

Jan. 20, 1978 [DE] Fed. Rep. of Germany ....... 2802487

[51] Int. Cl.³ .............................................. C08G 69/48
[52] U.S. Cl. ............................. 528/312; 260/29.2 N; 525/435; 528/310; 528/317; 528/318; 528/324; 528/336; 528/342; 528/397
[58] Field of Search ............... 528/342, 324, 310, 397, 528/336, 317, 318, 312; 525/435; 260/29.2 N

[56] References Cited

U.S. PATENT DOCUMENTS

| | | | |
|---|---|---|---|
| 2,969,302 | 1/1961 | Green | 162/164 |
| 3,125,552 | 3/1964 | Loshaek et al. | 528/342 |
| 3,239,491 | 3/1966 | Tsou et al. | 528/345 |
| 3,972,939 | 8/1976 | Spielberger et al. | 260/583 P |

FOREIGN PATENT DOCUMENTS 775721 5/1957 United Kingdom .
1035296 7/1966 United Kingdom .

*Primary Examiner*—Harold D. Anderson
*Attorney, Agent, or Firm*—Sprung, Felfe, Horn, Lynch & Kramer

[57] ABSTRACT

Water-soluble condensation products which are not self-crosslinking and are prepared from polyacidic amines and compounds which are polyfunctional towards amino groups, in an aqueous medium at temperatures from 0° to 120° C. and pH values above 6 in the presence of emulsifiers are used in the production of paper.

8 Claims, No Drawings

AQUEOUS REACTION OF POLYAMINE WITH ALKYLENE DIHALIDE IN PRESENCE OF EMULSIFIER

The invention relates to water-soluble condensation products, which are not self-crosslinking, of polyacidic amines and compounds which are polyfunctional towards amino groups, their preparation, their use in the production of paper, and auxiliaries which contain these condensation products.

The condensation products are characterised in that they are prepared in an aqueous medium at temperatures from 0° to 120° C. and pH values above 6 in the presence of emulsifiers.

The condensation products of polyacidic amines and compounds which are polyfunctional towards amino groups which are known hitherto and are used in the production of paper are prepared in the absence of emulsifiers.

It has now been found, surprisingly, that not only are the known reactions accelerated by adding emulsifiers, but that, in addition, they also lead to more effective drainage accelerators and retention agents.

Possible known processes which may be mentioned for the co-use, according to the invention, of emulsifiers are, inter alia: the reaction of polyalkylenepolyamines with dihalogenoethane and dihalogenopropane in an aqueous medium (British Patent Specification 775,721); the reaction of α- and β-halogeno-fatty acid esters, alone or in combination with bifunctional compounds containing epoxide groups, or α, β-unsaturated carboxylic acid esters and polyalkylenepolyamines (German Pat. Specification 1,006,155); the reaction of polyalkylenepolyamines with epihalogenohydrins or dihalogenohydrins in an aqueous medium (U.S. Pat. No. 2,969,302); the reaction of polyamide-amines from polyalkylenepolyamines and dicarboxylic acids with bifunctional compounds, in particular epichlorohydrin and 1,2-dichloroethane, in an aqueous medium (British Pat. Specification No. 1,035,296); the reaction of polyamide-amines from polyalkylenepolyamines, aminocarboxylic acids or lactams thereof and dicarboxylic acids with bifunctional compounds, above all dichloroethane or epichlorohydrin, in an aqueous medium (U.S. Pat. No. 3,893,885); the reaction of polyethylenepolyamines with 1,2-dichloroethane to give highly viscous aqueous solutions (900 mPas=milli Pascal per second at 25° C.) and subsequent reduction in viscosity to 300 to 600 mPas by thermal degradation at 25° C. (U.S. Pat. No. 3,972,939); the reaction of mixtures of polyamide-amines and one or more polyalkylenepolyamines with polyfunctional compounds, above all 1,2-dichloroethane and epichlorohydrin; and the reaction of polyacidic amines which contain amide groups and are prepared from 1.4 to 3 mols of polyalkylenepolyamine and 1 mol of dicarboxylic acids, with polyfunctional compounds, in particular 1,2-dichloroethane.

A large number of examples of polyacidic amines which can be used as starting materials are described in the abovementioned patent specifications.

Compounds which may be mentioned which are polyfunctional towards amino groups are, in particular, compounds which are sparingly soluble in water, such as α,ω-alkylene dihalides, for example 1,2-dichloroethane, 1,2-dibromoethane, 1,2-dichloropropane, 1,3-dichloropropane and 1,6-dichlorohexane; ω,ω'-dihalogenoethers, for example 2,2'-dichloro-diethyl ether, bis-(β-chloro-isopropyl) ether and bis-(4-chloro-butyl) ether; halogenohydrines and epihalogenohydrins, for example epichlorohydrin and 1,3-dichloropropanol-2; ω-halogenocarboxylic acid halides, for example chloroacetyl chloride, 2-chloropropionyl chloride, 3-chloropropionyl chloride and 3-bromopropionyl bromide; vinyl compounds, for example divinyl ether, divinyl sulphone and methylene-bisacrylamide; furthermore 4-chloromethyl-1,3-dioxolan-2-one and chloroformic acid 2-chloroethyl ester, and also chloroformic acid esters, 3-chloro-2-hydroxypropyl ether and glycidyl ethers of polyalkylene oxides, for example polyethylene oxides, as well as of reaction products of 1 to 50 mols of alkylene oxides, such as ethylene oxide and/or propylene oxide, and 1 mol of dihydric or polyhydric polyols or other compounds containing at least two active hydrogen atoms; and also derivatives of cyanuric chloride, such as 2,4-dichloro-6-alkyl-(aryl)-1,3,5-triazines, for example 2,4-dichloro-6-phenyl-1,3,5-triazine, as well as 2,4-dichloro-6-dialkyl(aryl)amino-1,3,5-triazines; for example 2,4-dichloro-6-dimethylamino-1,3,5-triazine; and trifunctional compounds, such as 1,3,5-triacryloyl-hexahydro-s-triazine and 2,4,6-trichloro-1,3,5-s-triazine.

The amount of emulsifier employed is between 1 and 0.00025%, relative to the weight of a 22.5% strength solution. Amounts from 0.08 to 0.01% are particularly suitable.

For each polyamide-amine or polyalkylenepolyamine reaction with polyfunctional compounds there is an emulsifier having an optimum action. The most suitable emulsifier can easily be found by preliminary experiments.

Non-ionic emulsifiers are preferably used. These are described, for example, in "K. Lindner Tenside, Textilhilfsmittel, Waschrohstoffe" (surface-active agents, textile auxiliaries and detergent bases) volume I (1964) pages 841–920.

Examples of these emulsifiers which may be mentioned are:

a. oxyalkylated products, such as addition products of 3–30 mols of ethylene oxide and 1 mol of p-nonylphenol, addition products of 15–40 mols of ethylene oxide and 1 mol of oleyl alcohol or coconut alcohol, addition products of 10–30 mols of ethylene oxide and 1 mol of oleic acid, ricinoleic acid or coconut oil acid addition products of 15–40 mols of ethylene oxide and 1 mol of castor oil, addition products of 20–50 mols of ethylene oxide and 1 mol of abietic acid, addition products of 10–15 mols of ethylene oxide and p-oxydiphenyl or alkyl and/or aralkyl derivatives thereof, addition products of 3–30 mols of ethylene oxide and the condensation products of alkylphenols, secondary amines and alkylene oxides, addition products of 3–30 mols of ethylene oxide and stearylamine and addition products of 30–40 mols of ethylene oxide and p-nonylphenol, oleyl alcohol or coconut alcohol, the OH group of which is blocked by acrylonitrile, b. non-oxyalkylated products, such as acid amides of monoethanol amine or diethanolamine and fatty acids such as palmitic acid, stearic acid, coconut oil acid and oleic acid, and acid amides of isopropanolamine and fatty acids such as lauric acid, myristic acid, coconut oil acid, palmitic acid and stearic acid.

Use of any of the emulsifiers results in a shortening of the reaction time. This shortening can be up to 50% in a particular case. Surprisingly, a further advantage of this process is found to be that, when the condensation products prepared according to the invention are used, they lead to retention agents and drainage accelerators which exhibit a better action, both in the basic and in the acid range, than the agents prepared according to the state of the art.

The condensation reaction is carried out, in particular, at a total concentration of polyacidic amine of 10 to 60%.

0.1 to 0.5 mol of the polyfunctional compound is preferably employed per mol of nitrogen in the polyacidic amine.

The temperatures are 0°–120° C., in particular 60°–90° C.

The pH value is above 6, in particular 8–11.

EXAMPLES (Ia) A nitrogen-containing reaction product was prepared
a. 108 g (1.05 mol) diethylene-triamine are mixed in a reaction vessel with gas feed tube and descending cooler with 146 g (1 mol) adipic acid and 57 g (0.5 mol) $\epsilon$-caprolactam with the addition of 7 g (0.04 mol) adipic acid dihydrazide. The mixture is heated to 190° C. within 3 to 4 hours, while stirring and passing over oxygen-free nitrogen; in the range from 150° to 190° C. the temperature is raised to such an extent that the water formed distills off at a uniform rate. When about 35 g of water and small amounts of diethylene-triamine have distilled off, the reaction mixture is further stirred at 190° to 180° C. under reduced pressure (20–50 mm Hg) until a total of 50 g of distillate have been obtained; the reaction mixture is then cooled to 130° C. and mixed with the same amount by weight (270 g) of water. The resultant 50% aqueous solution of the basic polyamide has a viscosity of 350–500 cp at 25° C. and an equivalent weight of about 420.
b. A mixture of 420 g (1 gram-equivalent) of this 50% polyamide solution, 428 g of water and 16.8 g (0.17 mol) 1,2-dichloro-ethane is heated in a reaction vessel with reflux condenser to 80°–90° C. and stirred at this temperature until the viscosity of the reaction solution has risen to about 250 cp at 80° C.; this is usually the case after 6–8 hours. The solution is then mixed with 150 g of water and 60 g of concentrated hydrochloric acid, and cooled. The resultant 20% aqueous solution of the reaction product formed has a pH value of 4.5. The viscosity was 250 mPas at 25° C. and the reaction time was 7 hours.

(Ib) The preparation was as for Ia, but 0.2 g of an emulsifier consisting of a polyether of lauryl alcohol and 7 mols of ethylene oxide was also additionally employed during the reaction Ib. The viscosity was 280 mPas at 25° C. and the reaction time was 5.5 hours.

(Ic) The preparation was as for 1a, but 0.2 g of an emulsifier consisting of a polyether of oleyl alcohol and 19 mols of ethylene oxide was also additionally employed during the reaction Ib. The viscosity was 270 mPas at 25° C. and the reaction time was 6 hours.

(Id) The preparation was as for Ia, but 0.2 g of an emulsifier consisting of a polyester of castor oil and ethylene oxide was also additionally employed during the reaction Ib. The viscosity was 300 mPas at 25° C. and the reaction time was 5 hours.

(IIa) Preparation of a reaction product (1) of a polyamideamine (2), a polyalkylenepolyamine (3) and 1,2-dichloroethane.

(1) 52 g of 1,2-dichloroethane are added to a mixture of 81.6 g of the 50% strength polyamide-amine solution described under (2), 72 g of the polyethylenepolyamine mixture, mentioned under (3), with a water content of 17% and an amine equivalent of 48.6 and 150 g of water at a temperature of 87°–93° C., whilst stirring very thoroughly, at a rate such that the temperature can be maintained in a range from 87°–93° C., whilst the 1,2-dichloroethane simmers (duration: about 6 hours). During the addition of the 1,2-dichloroethane, 50 g of 50% strength sodium hydroxide solution are also added, and in particular at a rate such that its addition is about 5 ml behind that of the 1,2-dichloroethane, also expressed in ml. The viscosity initially increases only very slowly and in the last phase more rapidly. The polycondensation reaction is interrupted, by adding acid, at the point in time when the viscosity has a value such that, after preparation of the polyamine is complete, a viscosity of 350–500 mPas in a 22.5% strength solution results. (About 7 hours after the start of the reaction.) 75 g of concentrated hydrochloric acid/$H_2O$ 2:1 are first added rapidly, whilst cooling, and then further concentrated hydrochloric acid is added in an amount such that a pH value of 4.0 is achieved, that is to say about 21 g. During cooling, the mixture is stirred under reduced pressure (50 mm Hg) for a further 1–2 hours in order to remove unreacted 1,2-dichloroethane. Finally, further water is added in an amount such that a 22.5% strength solution of the polyamine is obtained.

(2) 108 g (1.05 mols) of diethylenetriamine are mixed with 146 g (1 mol) of adipic acid in a reaction vessel with a gas inlet tube and a descending condenser, 9 g (0.05 mol) of adipic acid dihydrazide being added, and the mixture is heated to 190° C. in the course of 3–4 hours, whilst stirring and passing oxygen-free nitrogen over it, the reaction temperature in the range from 150°–190° C. being increased at a rate such that the water formed is uniformly distilled off. After about 30 g of water and small amounts of diethylenetriamine have distilled over, the reaction mixture is stirred under reduced pressure (20–50 mm/Hg) at 190°–180° C. until a total of 44 g of distillate have been obtained, and is then cooled to 130° C. and the same amount by weight (219 g) of water is added. The basic polyamide formed is thus obtained in the form of a 50% strength aqueous solution which has a viscosity of 300–400 mPas at 25° C. and an equivalent weight of 340.

(3) Excess ammonia is first separated off, under pressure, from the reaction mixture obtained by continuous reaction of dichloroethane, aqueous ammonia and ethylenediamine in the molar ratio 1:17:0.4 at 160°–220° C. and under 100 bars, and the bases formed are then liberated from their hydrochlorides at 130°–135° C. using excess 50% strength sodium hydroxide solution. Most of the water and of the ethylenediamine is thereby distilled off, whilst the higher-boiling bases separate out as a liquid. The base mixture thus obtained contains, in addition to 15–20% of water and 3–5% of ethylenediamine, about 15–20% of diethylenetriamine, 2–3% of aminoethylpiperazine, 1% of $NH_2-CH_2CH_2-NHCH_2CH_2-OH$, 15–18% of triethylenetetramine, 3–4% of tetraethylenetetramine, 10–14% of tetraethylenepentamine, 6–10% of pentaethylenehexamine and about 10–15% of higher polyethylenepolyamines and small amounts of sodium chloride and sodium hydroxide.

(IIb) The preparation was as for IIa, but 0.4 g of an emulsifier consisting of a polyether of lauryl alcohol and 7 mols of ethylene oxide was also additionally employed. The viscosity was 250 mPas at 25° C. and the reaction time was 4.5 hours.

(IIc) The preparation was as for IIa, but 0.4 g of an emulsifier consisting of a polyether of oleyl alcohol and 19 mols of ethylene oxide was also additionally employed. The viscosity was 290 mPas at 25° C. and the reaction time was 4.5 hours.

(IIIa) Preparation of a reaction product (1) of a polyamideamine (2) and 1,2-dichloroethane.

(1) 15.5 g of 1,2-dichloroethane are added to a mixture of 80 g of the 50% strength aqueous solution of the amide described under (2) and 60 g of water at a temperature of 87°–93° C. whilst stirring very thoroughly, at a rate such that the temperature can be maintained in the above range, whilst the mixture simmers—in the course of two hours in the case of this mixture. The mixture is then heated at the same temperature until the viscosity has risen to about 30–50 mPas. Thereafter, it is cooled to about 75° C. in order to prevent too rapid an increase in the viscosity in the last phase. The condensation reaction is then carried out at this lower temperature until the viscosity has a value such that, after preparation of the product is complete, a viscosity of 350–600 mPas/22.5% strength solution/25° C. results. In order to achieve this, the condensation reaction is ended in about the same viscosity range, but at 75° C., and in particular by cooling the mixture, simultaneously adding rapidly a mixture of 15 g of concentrated hydrochloric acid and 20 g of water and then adding further concentrated hydrochloric acid in an amount such that a pH value of 5.0 is established, for which about a further 11 g are necessary. During the cooling, the mixture is then stirred under reduced pressure (50 mm Hg) for a further 1–2 hours in order to completely remove unreacted 1,2-dichloroethane (about 0.5 g). Finally, the mixture is then made up with furher water to 195.1 g to give a 22.5% strength solution of the reaction product (calculated as the free base, that is to say without the hydrochloride).

After a reaction time of 13 hours, the viscosity was 420 mPas at 25° C.

(2) 461 g (2.25 mols) of the polyethylenepolyamine described under (3) with an amine equivalent of 43.7 and an average molecular weight of 205 are initially introduced into a 2 liter three-necked flask. 146 g (1 mol) of adipic acid are then added, whilst stirring, at a rate such that the internal temperature rises to 125° to 135° C. as a result of the heat of neutralisation. The clear melt of the salt is then heated to 195° to 200° C. in the course of 3 hours, whilst passing a weak stream of nitrogen over it, and this temperature is maintained for a further 3 hours. The polycondensation reaction is thereby brought to completion, 46.4 g of water (10.4 g more than that calculated purely for the formation of polyamide, which indicates additional formation of imidazoline rings from the polyamide group and an adjacent secondary amino group) and 0.6 g of low-boiling polyethylenepolyamines (possibly diethylenetriamine) passing over. The reaction product is then cooled to about 130° to 140° C. and 560 g of water are added rapidly at this temperature. A clear, yellow 50% strength aqueous solution of the polyamide thereby forms.

The anhydrous polyacidic amine containing amide groups has a viscosity of 25 mPas at 150° C.

(3) The excess ammonia is first separated off, under pressure, from the reaction mixture obtained by continuous reaction of dichloroethane, aqueous ammonia and ethylenediamine in the molar ratio 1:17:0.4 at 160°–220° C. and under 100 bars, and the bases formed are then liberated from their hydrochlorides at 130°–135° C. using excess 50% strength sodium hydroxide solution. Most of the water and of the ethylenediamine is thereby distilled off, whilst the higher-boiling bases separate out as a liquid. The rest of the water, ethylenediamine and most of the diethylenetriamine are distilled off from the base mixture thus obtained, first under normal pressure and then under a reduced pressure of about 100 mbars, and the sodium chloride which separates out is removed by filtration.

(IIIb) The preparation was as for IIIa, but 0.3 g of an emulsifier consisting of a polyether of oleyl alcohol and 10 mols of ethylene oxide was also additionally employed. The viscosity was 350 mPas at 25° C. and the reaction time was 10 hours.

(IIIc) The preparation was as for IIIa, but 0.3 g of an emulsifier consisting of a polyester of castor oil and ethylene oxide was also additionally employed. The viscosity was 400 mPas at 25° C. and the reaction time was 7.5 hours.

(IVa) Preparation of a reaction product (1) from the polyamide-amine IIa (3) and epichlorohydrin.

25 g of epichlorohydrin are added dropwise to 340 g of the polyamide-amine described under IIa (2) and 300 g of water and the mixture is then warmed to 65°–70° C., whilst stirring. As soon as the solution has a viscosity of about 150–200 mPas at this temperature, which is the case after about 2 hours, it is diluted with 100 g of water. The solution is then stirred at 70° C. until a viscosity of 300–350 mPas is reached (after about 4 hours) and is cooled and 57 g of concentrated hydrochloric acid are added. The 22.5% strength solution has a pH of 3.8–4 and a viscosity of 350–400 mPas at 25° C.

(IVb) The preparation is as for (IVa), but 0.4 g of an emulsifier consisting of a polyether of lauryl alcohol and 7 mols of ethylene oxide is also additionally employed. The viscosity is 300 mPas at 25° C. and the reaction time is 3 hours.

USE EXAMPLE 1

The degree of freeness was determined by the Schopper-Riegler method, as a measure of the drainage acceleration to be expected on a paper machine in practice. The more the degree of freeness is reduced by the retention agent added, the better is the drainage acceleration to be expected.

A further measure of the drainage acceleration to be expected on a paper machine is the so-called drainage time. This is determined by measuring, in a Schopper-Riegler freeness tester, the time which is required for a particular degree of freeness, or volume of water in the collecting glass, to be obtained. The shorter this time is, the better is the drainage acceleration which can be achieved.

Mixed waste paper was pulped using a high-speed stirrer and the pH value was adjusted as follows:

(a) acid range: 0.5% of aluminium sulphate was added and the pH was adjusted to 4.5 with sulphuric acid.

(b) Neutral range: the pH was adjusted to 7.2 with sodium hydroxide solution.

To 200 ml of the 1% strength pulp suspension prepared according to (a) or (b), in each case the 1% strength solution was made up to 1,000 ml with water and the degree of freeness was determined with the aid of the Schopper-Riegler apparatus.

The amounts added are based in each case on the weight of the air-dried pulp and on a 22.5% strength solution of the polyamines.

Tables 1–3 which follow illustrate that the polyamines I b-d, II b and c and III b and c prepared by the process according to the invention, that is to say using emulsifiers, have a better activity as drainage accelerators in the acid and in the neutral range, than the polyamines I a, II a and III a formed in the absence of emulsifiers. In addition to the degree of freeness, the drainage time in seconds which was necessary to achieve a particular degree of freeness is given in the tables. This degree of freeness should be slightly below the degree of freeness of the pulp without the addition of a retention agent.

TABLE 1

| Example | Amount added in % | Waste paper pH 7.2 degree of freeness [°SR] | seconds at 49 [°SR] | Amount added in % | Waste paper + 0.5% of alum + H$_2$SO$_4$, pH 4.5 degree of freeness [°SR] | seconds at 46 [°SR] |
|---|---|---|---|---|---|---|
| without a retention agent | | 53 | | | 48 | |
| I a | 0.2 | 48 | 53.5 | 0.1 | 44 | 45.2 |
| | 0.4 | 45 | 40.4 | 0.3 | 40 | 33.4 |
| I b | 0.2 | 47 | 47.0 | 0.1 | 43 | 42.2 |
| | 0.4 | 44 | 36.5 | 0.3 | 38 | 29.0 |
| I c | 0.2 | 47 | 49.5 | 0.1 | 43 | 43.3 |
| | 0.4 | 43 | 36.7 | 0.3 | 39 | 31.3 |
| I d | 0.2 | 47 | 45.3 | 0.1 | 43 | 39.5 |
| | 0.4 | 44 | 36.4 | 0.3 | 38 | 29.8 |

TABLE 2

| Example | Amount added in % | Waste paper pH 7.5 degree of freeness [°SR] | seconds at 53 [°SR] | Amount added in % | Waste paper + 0.5% of alum + H$_2$SO$_4$, pH 4.5 degree of freeness [°SR] | seconds at 53 [°SR] |
|---|---|---|---|---|---|---|
| without a retention agent | | 54 | | | 54 | |
| II a | 0.3 | 50 | 35.5 | 0.1 | 50 | 35.3 |
| | 0.6 | 42 | 22.1 | 0.3 | 49 | 30.2 |
| II b | 0.3 | 49 | 31.2 | 0.1 | 49 | 32.5 |
| | 0.6 | 40 | 18.4 | 0.3 | 47 | 28.5 |
| II c | 0.3 | 48 | 31.3 | 0.1 | 48 | 31.5 |
| | 0.6 | 41 | 19.8 | 0.3 | 47 | 27.6 |

TABLE 3

| Example | Amount added in % | Waste paper pH 7.3 degree of freeness [°SR] | seconds at 49 [°SR] | Amount added in % | Waste paper + 0.5% of alum + H$_2$SO$_4$, pH 4.5 degree of freeness [°SR] | seconds at 49 [°SR] |
|---|---|---|---|---|---|---|
| without a retention agent | | 50 | | | 49 | |
| III a | 0.2 | 46 | 38.1 | 0.1 | 45 | 38.7 |
| | 0.4 | 38 | 22.1 | 0.3 | 41 | 28.4 |
| III b | 0.2 | 45 | 37.0 | 0.1 | 44 | 36.1 |
| | 0.4 | 36 | 20.6 | 0.3 | 41 | 27.5 |
| III c | 0.2 | 44 | 36.4 | 0.1 | 43 | 36.7 |
| | 0.4 | 35 | 20.9 | 0.3 | 40 | 26.2 |

We claim:

1. A process for the preparation of a water-soluble condensation produce which is not self-crosslinking, comprising reacting a polyamine selected from the group consisting of a polyalkylenepolyamine, a reaction product of a dicarboxylic acid and excess polyalkylenepolyamine and a reaction product of a dicarboxylic acid, aminocarboxylic acid or lactam thereof and excess polyalkylenepolyamine, with an alkylene dihalide in an aqueous medium at 0° to 120° C. and a pH above 6 in the presence of an emulsifier.

2. A process according to claim 1 in which the polyamine is a polyalkylenepolyamine.

3. A process according to claim 1, in which the polyamine contains amide groups.

4. A process according to claim 1, in which the polyamine comprises a mixture of polyalkylenepolyamines and polyamines containing amide groups.

5. A process according to claim 1, in which the alkylene dihalide is 1,2-dichloroethane.

6. A process according to claim 1, in which the emulsifier is non-ionic.

7. A process according to claim 1, in which the emulsifier is an oxyethylation product of a fatty alcohol or unsaturated fatty acid.

8. A process according to claim 1, in which the emulsifier is present in 0.08 to 0.01% relative to the weight of a 22.5% strength solution of the condensation products.

* * * * *